United States Patent
Kim et al.

(10) Patent No.: US 10,771,005 B2
(45) Date of Patent: Sep. 8, 2020

(54) INVERTER SYSTEM FOR VEHICLE

(71) Applicants: HYUNDAI MOTOR COMPANY, Seoul (KR); KIA MOTORS CORPORATION, Seoul (KR)

(72) Inventors: Beom Sik Kim, Gwangmyeong-si (KR); Jin Hwan Jung, Suwon-si (KR); Sang Cheol Shin, Suwon-si (KR); Ji Woong Jang, Hwaseong-si (KR); Ki Young Jang, Incheon (KR); Ki Jong Lee, Osan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/389,450

(22) Filed: Apr. 19, 2019

(65) Prior Publication Data
US 2020/0144954 A1 May 7, 2020

(30) Foreign Application Priority Data
Nov. 2, 2018 (KR) .......................... 10-2018-0133265

(51) Int. Cl.
*H02P 1/30* (2006.01)
*H02P 1/52* (2006.01)
(Continued)

(52) U.S. Cl.
CPC ............ *H02P 29/028* (2013.01); *B60L 3/003* (2013.01); *B60L 15/08* (2013.01); *B60L 50/51* (2019.02);
(Continued)

(58) Field of Classification Search
CPC ............................ H02P 29/028; B60L 50/51
(Continued)

(56) References Cited

U.S. PATENT DOCUMENTS 5,414,339 A * 5/1995 Masaki ................... B60L 3/003
318/800
7,071,639 B2 7/2006 Ochiai et al.
(Continued)

FOREIGN PATENT DOCUMENTS

JP          5104258 B2    12/2012
JP          5851267 B2     2/2016
KR  10-2011-0105034 A     9/2011

OTHER PUBLICATIONS

U.S. Non-Final Office Action dated Sep. 5, 2019 issued in U.S. Appl. No. 16/132,828.
(Continued)

*Primary Examiner* — Erick D Glass
(74) *Attorney, Agent, or Firm* — Morgan, Lewis & Bockius LLP

(57) ABSTRACT

An inverter system for a vehicle includes: an energy storage device configured to store electrical energy, a first inverter including a plurality of first switching elements and configured to convert the electrical energy stored in the energy storage device into alternating-current (AC) electric power, a second inverter including a plurality of second switching elements different from the plurality of first switching elements, a motor configured to be driven by receiving the AC power converted by the first inverter and the second inverter, current sensors disposed between the first inverter and the motor and the second inverters and the motor, respectively, and configured to detect a current input to the motor, and a controller configured to generate a pulse width modulation (PWM) signal for controlling driving of the motor.

9 Claims, 5 Drawing Sheets

(51) Int. Cl.
   *H02P 3/00*      (2006.01)
   *H02P 29/028*    (2016.01)
   *B60L 50/51*     (2019.01)
   *B60L 3/00*      (2019.01)
   *B60L 15/08*     (2006.01)
   *H02P 27/08*     (2006.01)

(52) U.S. Cl.
   CPC ......... *H02P 27/085* (2013.01); *B60L 2210/40* (2013.01)

(58) Field of Classification Search
   USPC .......................................... 318/503, 504, 139
   See application file for complete search history.

(56) References Cited

U.S. PATENT DOCUMENTS

| | | | |
|---|---|---|---|
| 7,099,756 B2 * | 8/2006 | Sato | B60L 50/16 701/22 |
| 7,277,304 B2 | 10/2007 | Stancu et al. | |
| 8,193,743 B2 | 6/2012 | Yamada et al. | |
| 9,024,563 B2 | 5/2015 | Bunte et al. | |
| 9,692,342 B2 * | 6/2017 | Kano | H02P 25/22 |
| 9,834,098 B2 * | 12/2017 | King | B60L 50/51 |
| 9,853,570 B2 | 12/2017 | Maly | |
| 9,917,543 B1 | 3/2018 | Sarlioglu et al. | |
| 10,348,222 B2 | 7/2019 | Dutta et al. | |
| 10,411,532 B2 | 9/2019 | Lee et al. | |
| 2004/0262057 A1 | 12/2004 | Kumar | |
| 2005/0082096 A1 | 4/2005 | Oono | |
| 2010/0013438 A1 | 1/2010 | Anwar et al. | |
| 2015/0043254 A1 | 2/2015 | Preckwinkel et al. | |
| 2015/0117073 A1 | 4/2015 | Flett | |
| 2017/0250623 A1 | 8/2017 | Maly | |
| 2019/0006979 A1 | 1/2019 | Suzuki et al. | |

OTHER PUBLICATIONS

U.S. Non-Final Office Action dated Sep. 17, 2019 issued in U.S. Appl. No. 16/182,846.
U.S. Non-Final Office Action dated Sep. 25, 2019 issued in U.S. Appl. No. 16/142,594.
U.S. Notice of Allowance dated Jan. 22, 2020 issued in U.S. Appl. No. 16/182,846.
U.S. Notice of Allowance dated Jan. 23, 2020 issued in U.S. Appl. No. 16/142,594.
Extended European Search Report dated Jul. 1, 2019 issued in European Patent Application No. 19169445.4.
U.S. Notice of Allowance dated Feb. 24, 2020 issued in U.S. Appl. No. 16/132,828.

* cited by examiner

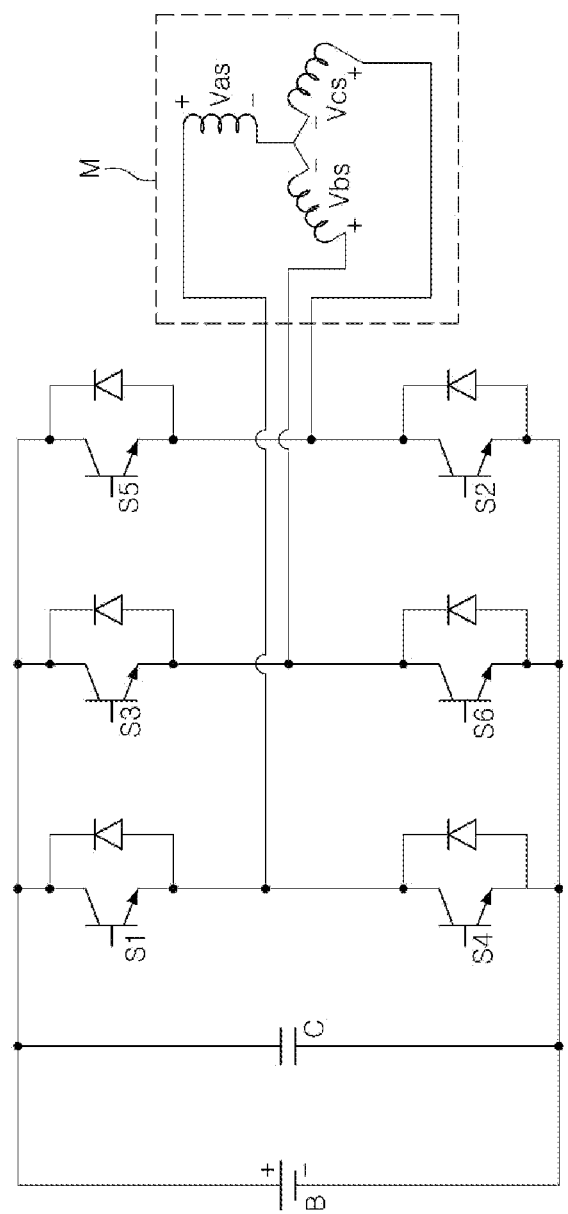
[FIG. 1]
-PRIOR ART-

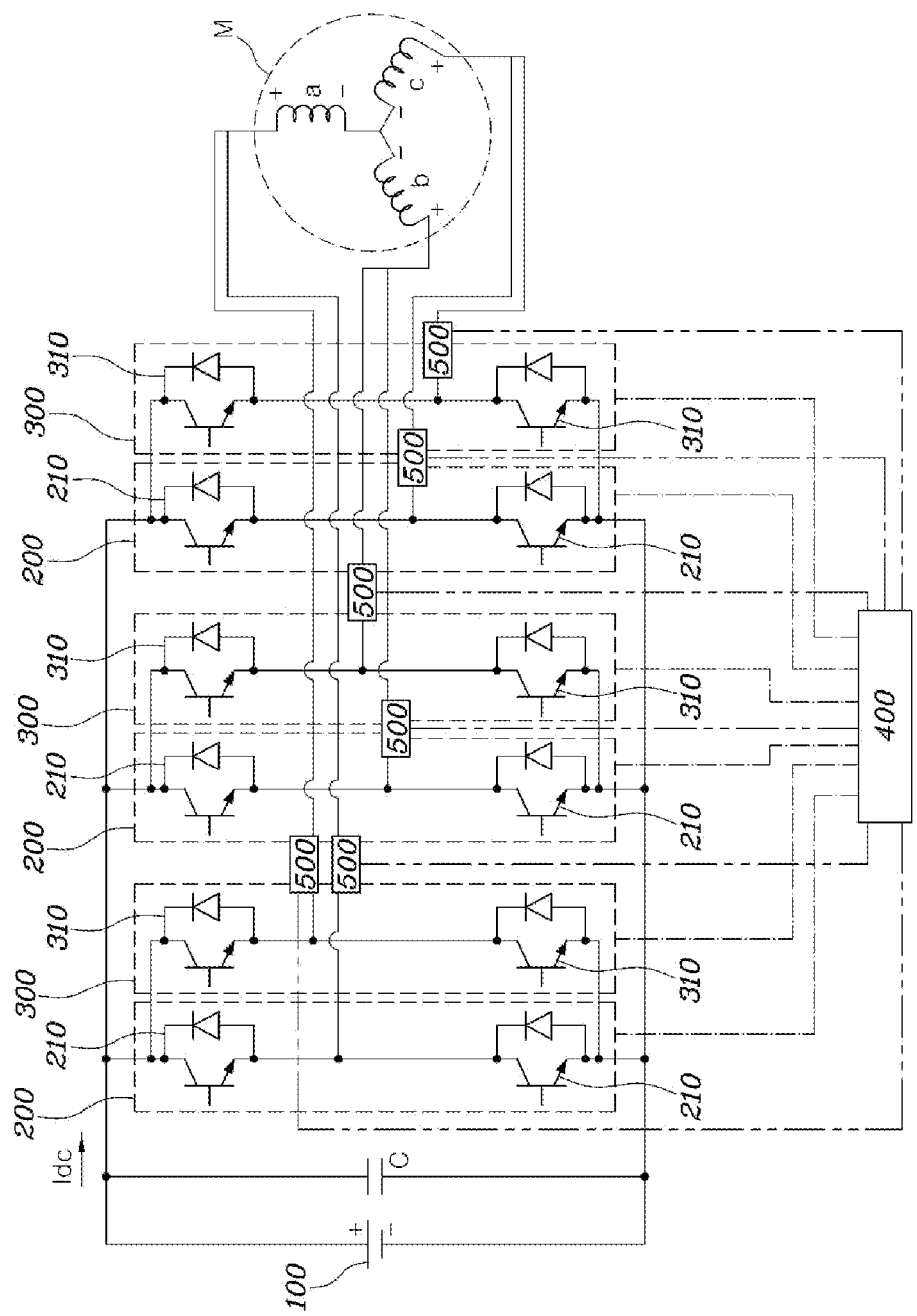
[FIG. 2]

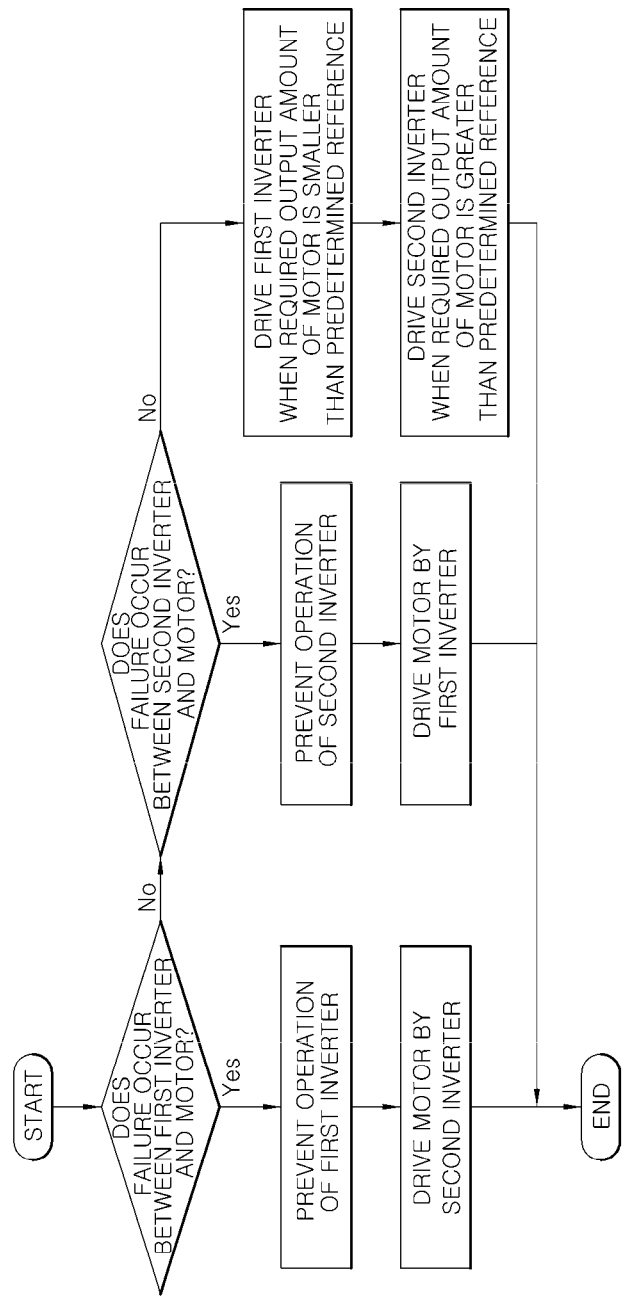
[FIG. 3]

[FIG. 4]
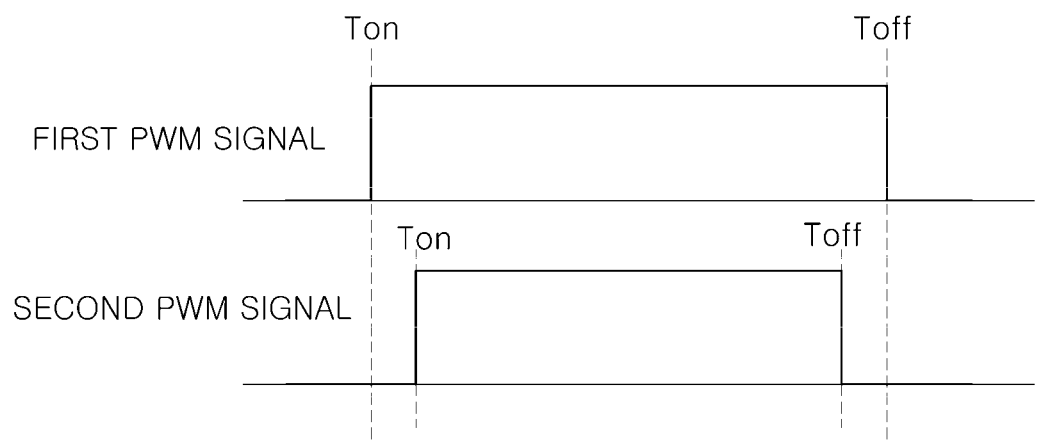

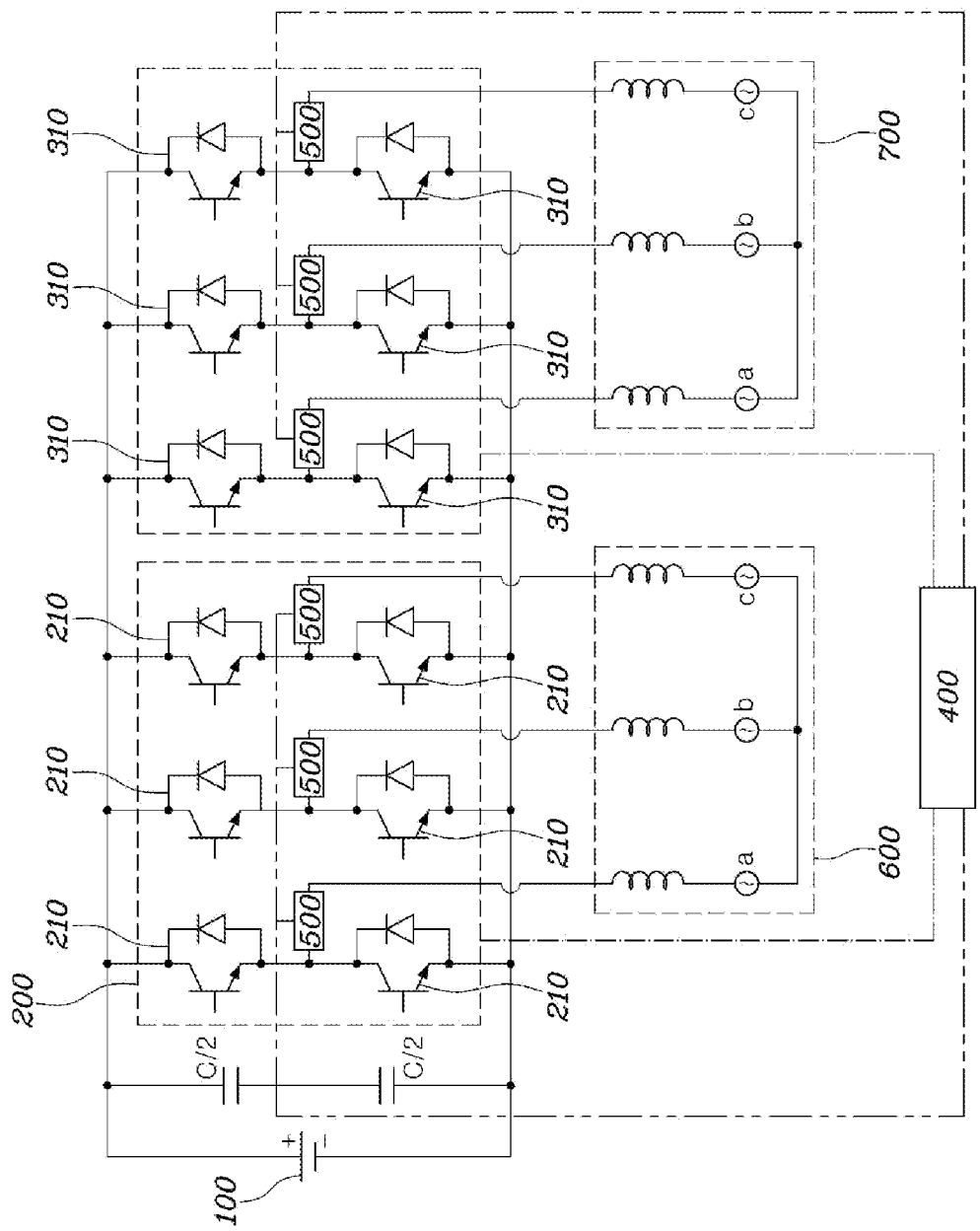
[FIG. 5]

INVERTER SYSTEM FOR VEHICLE

CROSS REFERENCE TO RELATED APPLICATION

The present application claims priority of Korean Patent Application No. 10-2018-0133265 filed on Nov. 2, 2018 in the Korean Intellectual Property Office, the entire contents of which is incorporated herein for all purposes by this reference.

TECHNICAL FIELD

The present disclosure relates to an inverter system for a vehicle, and more particularly, to an inverter system for a vehicle capable of improving efficiency and an output by driving an inverter according to a required output amount of the vehicle and thus allowing the vehicle to be driven according to a limp home mode when the inverter fails.

BACKGROUND

Recently, technologies relating to eco-friendly vehicles using electrical energy as vehicle power have been actively developed in response to air pollution and the crisis of oil depletion. The eco-friendly vehicles include hybrid electric vehicles, fuel cell electric vehicles, electric vehicles, and the like.

Referring to FIG. 1, in a conventional inverter system for a vehicle for outputting a high output, for a high output, a motor is driven by connecting a plurality of switching elements S1 to S6 in parallel. However, in the conventional inverter system, the high output can be obtained by connecting the plurality of switching elements to the motor in parallel, but in a fuel economic driving mode in which a required output amount of a motor is relatively low, excessive switching and conduction losses occur in the switching elements such that there is limitation in that fuel efficiency of the vehicle is entirely lowered. Further, in the conventional inverter system for a vehicle, there is a limitation in that limp home driving is impossible when a failure such as disconnection or the like occurs between the motor and the inverter.

SUMMARY

Accordingly, the present disclosure has been made keeping in mind the above problems occurring in the related art, and the present disclosure is intended to propose an inverter system for a vehicle, which is capable of improving efficiency and an output of the vehicle by differently controlling a point of time of turning a first inverter and a second inverter on and off on the basis of an output amount of a motor and maintaining driving of the vehicle through limp home driving when a failure such as disconnection between the motor and the first or second inverter.

According to an exemplary embodiment of the present disclosure, an inverter system for a vehicle includes: an energy storage device configured to store electrical energy; a first inverter including a plurality of first switching elements and configured to convert the electrical energy stored in the energy storage device into alternating-current (AC) electric power; a second inverter including a plurality of second switching elements different from the plurality of first switching elements; connected to the energy storage device in a parallel relationship with the first inverter, and configured to convert the electrical energy stored in the energy storage device into AC power; a motor configured to be driven by receiving the AC power converted by the first inverter and the second inverter; current sensors disposed between the first inverter and the motor and between the second inverter and the motor, respectively, and configured to detect a current input to the motor; and a controller configured to generate a pulse width modulation (PWM) signal for controlling driving of the motor, determine a failure occurrence position between the first inverter and the motor or the second inverter and the motor based on the detected current, configured to control the motor to be driven by the first inverter or the second inverter according to the failure occurrence position.

When a failure is determined as occurring between the first inverter and the motor, the controller may allow the motor to be driven by the second inverter, and when the failure is determined as occurring between the second inverter and the motor, the controller may allow the motor to be driven by the first inverter.

When the failure is determined as not occurring between the first and second inverters and the motor, the controller may control driving of the first inverter and the second inverter on the basis of a required output amount of the motor.

When the required output amount of the motor is smaller than a predetermined reference, the controller may control the plurality of first switching elements to drive the first inverter.

When the required output amount of the motor is greater than the predetermined reference, the controller may control the plurality of second switching elements to drive the second inverter.

When the required output amount of the motor is greater than the predetermined reference, the controller may input a first PWM signal obtained by converting the PWM signal to the first inverter so as to control the plurality of first switching elements to be turned on prior to the plurality of second switching elements and to be turned off later than the plurality of second switching elements.

When the required output amount of the motor is greater than the predetermined reference, the controller may input a second PWM signal obtained by converting the PWM signal to the first inverter so as to control the plurality of second switching elements to be turned on later than the plurality of first switching elements and to be turned off prior to the plurality of first switching elements.

Each of the plurality of first switching elements may be a silicon carbide-field effect transistor (SiC-FET) and each of the plurality of second switching elements may be a Si-insulated gate type bipolar transistor (IGBT).

Switching and conduction losses of the first inverter may be smaller than those of the second inverter.

The first inverter may have a rated output for driving the motor, which is smaller than that of the second inverter.

The motor may be a single motor which is operated by selectively or simultaneously receiving the electric power converted by the first inverter and the second inverter according to a required output of the motor.

The motor may include a first motor driven by receiving the electric power converted by the first inverter and a second motor driven by receiving the electric power converted by the second inverter.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a diagram illustrating a conventional inverter system;

FIG. 2 is a diagram illustrating an inverter system for a vehicle according to one embodiment of the present disclosure;

FIG. 3 is a flowchart illustrating a driving flow of a motor by a first inverter or a second inverter according to a failure occurrence position between the first and second inverters and the motor in the inverter system for a vehicle according to one embodiment of the present disclosure;

FIG. 4 is a diagram illustrating a pulse width modulation (PWM) signal input to the first inverter and the second inverter when a required output amount of the motor is greater than a reference in the inverter system for a vehicle according to one embodiment of the present disclosure; and FIG. 5 is a diagram illustrating an inverter system for a vehicle according to another embodiment of the present disclosure.

DETAILED DESCRIPTION

Hereinafter, an inverter system for a vehicle according to exemplary embodiments of the present disclosure will be described with reference to the accompanying drawings.

FIG. 2 is a diagram illustrating an inverter system for a vehicle according to one embodiment of the present disclosure, FIG. 3 is a flowchart illustrating a driving flow of a motor by a first inverter or a second inverter according to a failure occurrence position between the first and second inverters and the motor, and FIG. 4 is a diagram illustrating a pulse width modulation (PWM) signal input to the first inverter and the second inverter when a required output amount of the motor is greater than a reference.

As shown in FIG. 2, an inverter system for a vehicle according to one embodiment of the present disclosure may include an energy storage device 100, a first inverter 200, a second inverter 300, a motor M, a controller 400, and a current sensor 500. Hereinafter, a detailed configuration of the inverter system for a vehicle according to the present disclosure will be described in detail.

The energy storage device 100 stores electrical energy and serves to provide the electrical energy for driving the motor M. According to the present embodiment, the energy storage device 100 may be a battery for storing and providing electrical energy for driving the motor M of the vehicle. However, this is merely one example, and various devices including a supercapacitor and the like may be used as an energy storage device of the present disclosure as long as they can serve to store and provide electrical energy for driving a motor of a vehicle.

The first inverter 200 includes a plurality of first switching elements 210 and serves to convert the electrical energy stored in the energy storage device 100 into alternating-current (AC) electric power. Here, as shown in FIG. 2, the plurality of first switching elements 210 are connected in parallel to each other and a plurality of output terminals of the first switching elements 210 connected in parallel may be connected to each of Phases a, b, and c of the motor M. Further, the plurality of first switching elements 210 in the first inverter 200 may convert direct-current (DC) electric power transmitted from the energy storage device 100 into AC electric power, and the DC electric power is converted into the AC electric power through an inverter is a well-known technique so that a detailed description thereof will be omitted.

Each of the plurality of first switching elements 210 may be a silicon carbide-field effect transistor (SiC-FET). In the present disclosure, the reason for using the SiC-FET as each of the plurality of first switching elements 210 is that the SiC FET has switching and conduction losses that are relatively significantly lower than those of a Si-insulated gate bipolar transistor (IGBT) at a lower load. That is, when a required output amount of the motor M is small, the motor M is driven through the first inverter 200 including the SiC-FET such that switching and conduction losses may be reduced and thus overall fuel efficiency of the vehicle may be improved.

The first inverter 200 configured with the plurality of first switching elements 210 may have switching and conduction losses that are lower than those of the second inverter 300 which will be described below. Further, the first inverter 200 may have a rated output for driving the motor M, which is smaller than that of the second inverter 300.

The second inverter 300 includes a plurality of second switching elements 310 different from kinds of the plurality of first switching elements 210 and serves to convert the electrical energy stored in the energy storage device 100 into the AC electric power. Here, as shown in FIG. 2, the plurality of first switching elements 310 are connected in parallel and a plurality of output terminals of the first switching elements 310 connected in parallel may be connected to each of Phases a, b, and c of the motor M. Further, the second inverter 300 may be connected to the energy storage device 100 in a parallel relationship with the first inverter 200.

Further, the plurality of second switching elements 310 in the second inverter 300 may be turned on and off by the controller 400, which will be described below, to convert the DC electric power transmitted from the energy storage device 100 into the AC electric power. The conversion from the DC electric power into the AC electric power through the inverter is a well-known technique, a detailed description thereof will be omitted.

The second switching element 310 may be a silicon insulated gate bipolar transistor (Si-IGBT). In the present disclosure, the plurality of second switching elements 310 which are Si-IGBTs are connected in parallel and the motor M is driven by the second inverter 300 including the Si-IGBTs in a high output mode in which a required output amount of the motor M is high such that a high output may be output. For convenience of description, in the following detailed description, it will be described by assuming that the plurality of first switching elements 210 are SiC-FET devices and the plurality of second switching elements 310 are Si-IGBT devices.

The motor M may be driven by receiving the AC electric power converted through the first inverter 200 and the second inverter 300. That is, the motor M is driven through the electric power supplied through the first inverter 200 and the second inverter 300 to drive the vehicle.

As shown in FIG. 2, the current sensor 500 is disposed between the first and second inverters 200 and 300 and the motor M and may detect a current input to the motor M. Specifically, the current sensor 500 may be disposed between the plurality of output terminals of the plurality of first switching elements 210 connected in parallel and each of Phases a, b, and c of the motor M and may be disposed between a plurality of output terminals of the plurality of second switching element 310 connected in parallel and each of Phases a, b, and c of the motor M. That is, the current sensor 500 may detect a current input to each of Phases a, b, and c of the motor M at each of the plurality of output terminals of the plurality of first parallel-connected switching elements 210 and the plurality of second parallel-connected switching element 310.

The controller 400 may generate a PWM signal for controlling driving of the motor M. Here, the controller 400 may receive an output current of the motor M, compare the output current of the motor M with a current reference, and generate a PWM signal to direct the output current of the motor M to converge on the current reference.

Further, the controller 400 may determine a failure occurrence position between the first and second inverters 200 and 300 and the motor M on the basis of the detected current at the current sensor 500. In this case, when a current is not detected at a specific position through the current sensor 500, the controller 400 may determine a failure such as disconnection as occurring at the corresponding position. Further, if a failure occurrence position is determined, the controller 400 may drive the motor M by the first inverter 200 or the second inverter 300 according to the failure occurrence position.

For example, to describe with reference to FIG. 3, when a current is not detected between the first inverter 200 and the motor M, the controller 400 may determine a failure as occurring between the first inverter 200 and the motor M to prevent an operation of the first inverter 200 and allow the motor M to be driven by the second inverter 300 connected in a parallel relationship with the first inverter 200. On the other hand, when a current is not detected between the second inverter 300 and the motor M, the controller 400 may determine the failure as occurring between the second inverter 300 and the motor M to prevent an operation of the second inverter 300 and allow the motor M to be driven by the first inverter 200 connected in a parallel relationship with the second inverter 300.

As described above, in the present disclosure, when a failure such as disconnection or the like occurs between an inverter and a motor, the vehicle is continuously driving in a limp home mode according to the above-described method such that it is possible to store the vehicle in a service center for repairing.

On the other hand, when a failure is determined as not occurring between the first and second inverters 200 and 300 and the motor M, the controller 400 may control the driving of the first inverter 200 and the second inverter 300 on the basis of a required output amount of the motor M. Here, the required output amount of motor M may be a required output amount of the vehicle. In other words, the controller 400 may drive one or more of the first inverter 200 and the second inverter 300 according to a fuel economic driving mode in which the required output amount of the vehicle is relatively low and a sport mode or a high output mode in which the required output amount of the vehicle is relatively high, thereby driving the motor M.

More specifically, when the required output amount of the motor M is smaller than a reference, i.e., in the fuel economic driving mode in which the required output amount of the vehicle is relatively low, the controller 400 may drive the first inverter 200 by inputting the PWM signal to the plurality of first switching elements 210. In other words, when the required output amount of the motor M is smaller than the predetermined reference, the controller 400 converts the electrical energy provided from the energy storage device 100 into AC electric power through the first inverter 200 and transmits the AC electric power to the motor M, thereby improving overall fuel efficiency of the vehicle.

Further, when the required output amount of the motor M is greater than the reference, i.e., in the sport mode or the high output mode in which the required output amount of the vehicle is relatively high, the controller 400 may drive the second inverter 300 by inputting the PWM signal to the plurality of second switching elements 310. In other words, when the required output amount of the motor M is greater than the predetermined reference, the controller 400 converts the electrical energy provided from the energy storage device 100 into AC electric power through the second inverter 300 and transmits the AC electric power to the motor M, thereby outputting a high output.

Referring to FIG. 3, when the required output amount of the motor M is greater than the reference, the controller 400 may control the plurality of first switching elements 210 to be turned on prior to the plurality of second switching elements 310 and to be turned off later than the plurality of second switching elements 310 by inputting a first PWM signal obtained by converting the PWM signal to the first inverter 200. Further, when the required output amount of the motor M is greater than the predetermined reference, the controller 400 may control the plurality of second switching elements 310 to be turned on later than the plurality of first switching elements 210 and to be turned off prior to the plurality of first switching elements 210 by inputting a second PWM signal obtained by converting the PWM signal to the second inverter 300.

As described above, in the present disclosure, when the required output amount of the motor M is greater than the reference, the PWM signal is converted and input to the first inverter 200 and the second inverter 300 so as to control the plurality of first switching elements 210 to be turned on prior to the plurality of second switching elements 310 and to be turned off later than the plurality of second switching elements 310 such that switching losses of the plurality of first and second switching elements 210 and 310 of the first and second inverters 200 and 300 may be reduced.

Referring back to FIG. 2, the motor M according to one embodiment of the present disclosure may be a single motor which is operated by selectively or simultaneously receive the electric power converted by the first inverter 200 and the second inverter 300 according to the required output amount of the motor M. Specifically, as shown in FIG. 2 according to the present embodiment, when the motor M is a three-phase motor, the output terminals of the first inverter 200 and the second inverter 300 are commonly connected to Phases a, b, and c of the motor M. In this case, when the required output amount of the motor M is smaller than the predetermined reference, the controller 400 may drive the motor M by controlling the plurality of first switching elements 210 to drive the first inverter 200. Further, when the required output amount of the motor M is greater than the predetermined reference, the controller 400 may drive the motor M by controlling the plurality of second switching elements 310 to drive the second inverter 300 or by controlling the plurality of first switching elements 210 and the plurality of second switching elements 310 to drive the first inverter 200 and the second inverter 300.

Referring to FIG. 5, a motor according to another embodiment of the present disclosure may include a first motor 600 driven by receiving electric power converted by the first inverter 200, and a second motor 700 driven by receiving electric power converted by the second inverter 300. More specifically, as shown in FIG. 5, when the motor is configured with the first motor 600 and the second motor 700, the output terminals of the first inverter 200 may be connected to Phases a, b, and c of the first motor 600, and the output terminals of the second inverter 300 may be connected to Phases a, b, and c of the second motor 700. In this case, when the required output amount of the motor is smaller than a predetermined reference, the controller 400 may drive the first motor 600 by controlling the plurality of first switching elements 210 to drive the first inverter 200. Further, when the required output amount of the motor is greater than the predetermined reference, the controller 400 may drive the second motor 700 by controlling the plurality of second switching elements 310 to drive the second inverter 300.

In accordance with the present disclosure, points of time for turning a first inverter and a second inverter on and off are controlled to be different on the basis of an output amount of a motor such that efficiency and an output of a vehicle can be improved and a switching loss can be reduced.

Further, when a failure such as disconnection or the like occurs between the motor and the first and second inverters, limp home driving is performed such that driving of the vehicle can be maintained.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. An inverter system for a vehicle, comprising:
   an energy storage device configured to store electrical energy;
   a first inverter including a plurality of first switching elements, wherein the first inverter is configured to convert the electrical energy stored in the energy storage device into alternating-current (AC) electric power;
   a second inverter including a plurality of second switching elements different from the plurality of first switching elements, wherein the second inverter is connected to the energy storage device in a parallel relationship with the first inverter, and is configured to convert the electrical energy stored in the energy storage device into AC power;
   a motor configured to be driven by receiving AC power converted by the first inverter and the second inverter;
   current sensors disposed between the first inverter and the motor and disposed between the second inverter and the motor, respectively, wherein each of the current sensor is configured to detect a current input to the motor; and
   a controller configured to generate a pulse width modulation (PWM) signal for controlling driving of the motor, to determine a failure occurrence position between the first inverter and the motor or the second inverter and the motor based on the detected current, and to control the motor to be driven by the first inverter or the second inverter according to the failure occurrence position,
   wherein, when a failure does not occur between the first inverter and the motor or the second inverter and the motor, the controller controls driving of the first inverter and the second inverter based on a required output amount of the motor,
   wherein, when the required output amount of the motor is smaller than a reference value, the controller controls the plurality of first switching elements to drive the first inverter, and
   wherein switching and conduction losses of the first inverter are smaller than those of the second inverter.

2. The inverter system of claim 1, wherein, when the failure occurs between the first inverter and the motor, the controller controls the motor to be driven by the second inverter, and
   when the failure occurs between the second inverter and the motor, the controller controls the motor to be driven by the first inverter.

3. The inverter system of claim 1, wherein, when the required output amount of the motor is greater than the reference value, the controller controls the plurality of second switching elements to drive the second inverter.

4. The inverter system of claim 1, wherein, when the required output amount of the motor is greater than the reference value, the controller inputs a first PWM signal obtained by converting the PWM signal to the first inverter to control the plurality of first switching elements to be turned on prior to the plurality of second switching elements and to be turned off later than the plurality of second switching elements.

5. The inverter system of claim 1, wherein, when the required output amount of the motor is greater than the reference value, the controller inputs a second PWM signal obtained by converting the PWM signal to the first inverter to control the plurality of second switching elements to be turned on later than the plurality of first switching elements and to be turned off prior to the plurality of first switching elements.

6. The inverter system of claim 1, wherein each of the plurality of first switching elements is a silicon carbide-field effect transistor (SiC-FET), and each of the plurality of second switching elements is a Si-insulated gate type bipolar transistor (IGBT).

7. The inverter system of claim 1, wherein the first inverter has a rated output for driving the motor, which is smaller than that of the second inverter.

8. The inverter system of claim 1, wherein the motor is a single motor operated by selectively or simultaneously receiving the electric power converted by the first inverter and the second inverter according to the required output amount of the motor.

9. The inverter system of claim 1, wherein the motor includes:
   a first motor driven by receiving the electric power converted by the first inverter; and
   a second motor driven by receiving the electric power converted by the second inverter.

* * * * *